July 31, 1956

P. A. R. A. MARRIÉ

2,757,373

FOUR WHEEL DRIVEN TRACTORS WITH SPRING MOUNTED WALKING BEAMS

Filed April 17, 1951

Inventor
Paul Auguste Rene Andre Marrié
By Robert E. Burns
Attorney

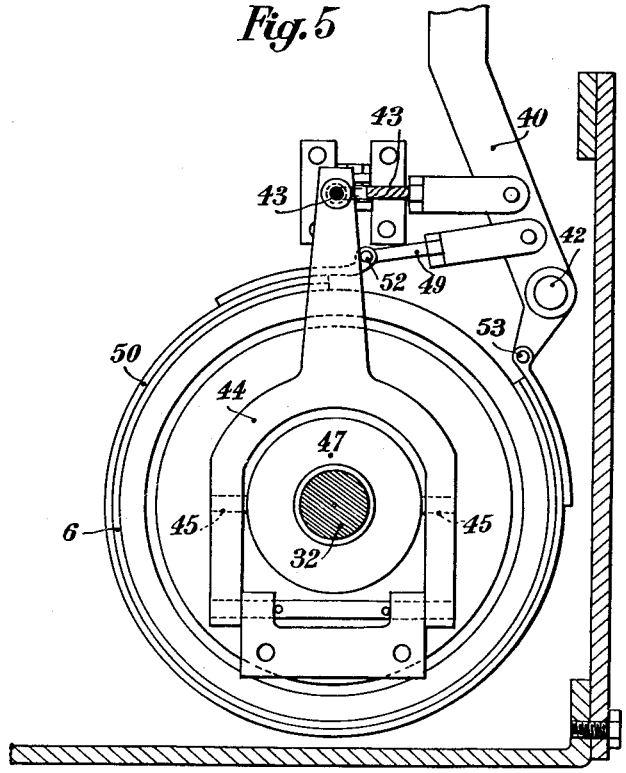

United States Patent Office 2,757,373
Patented July 31, 1956

2,757,373

FOUR WHEEL DRIVEN TRACTORS WITH SPRING MOUNTED WALKING BEAMS

Paul Auguste René André Marrié, Angers, France, assignor to Société à Responsabilité Limitee dite: S. E. B. I. M., Societe d'Exploitation des Brevets et Inventions Marrie, Angers, France Application April 17, 1951, Serial No. 221,431

Claims priority, application France April 25, 1950

3 Claims. (Cl. 180—49)

The present invention relates to four-driving-wheel tractors designed more particularly for farming purposes. Commonly used tractors of the prior art are provided with a gasoline or a gas oil engine of greater or lesser power according to the kind of work assigned thereto, and with a gear box including two to five forward drive gears and one or two reverse drive gears; the rear wheels are of large diameter and are the only drivers; through a differential gear, included in the rear axle, power is transmitted to a pair of half shafts housed in casings rigid with the chassis. The front wheels are smaller in diameter and are usually not driving wheels but are used only to steer. Tractors of this kind have a number of limitations.

Since only the rear wheels are drivers, traction depends on the weight thereon exclusive of the weight on the front wheels; this makes it necessary in order to obtain a reasonably high pull, to increase the overall weight of the vehicle. Consequently it becomes necessary to equip them with higher-powered engines, whereby the manufacturing and fuel costs are increased considerably. Because of this, 20 H. P. tractors are constructed that weigh in excess of 1 metric ton while the weight of a 50 H. P. tractor runs to at least 3.5 tons.

In a first embodiment of the tractor a pair of half shafts are driven by one single differential gear.

In a further embodiment of the tractor each half shaft is driven through a separate clutch.

The wheels are driven each through a chain trained over a pinion carried by the half shaft belonging to the related side.

Preferably, walking beams are attached at their ends to longitudinal leaf springs which are secured at their middles to the chassis of the tractor.

The brakes are arranged on the half shafts and are provided with separate controls.

Also, the control for each clutch is so associated with that of the brake on the corresponding half shaft that the same can be made to run idle and/or braked as desired.

Preferably, the clutches are run dry.

Further features of the invention will become apparent in the course of the following description of two preferred embodiments of the invention which are given for the purpose of exemplification and by no means of limitation and in which reference is made to the drawings appended hereto.

Figure 5 is a sectional view of the same taken on the section line V—V in Fig. 4, looking towards the left.

Figure 1:
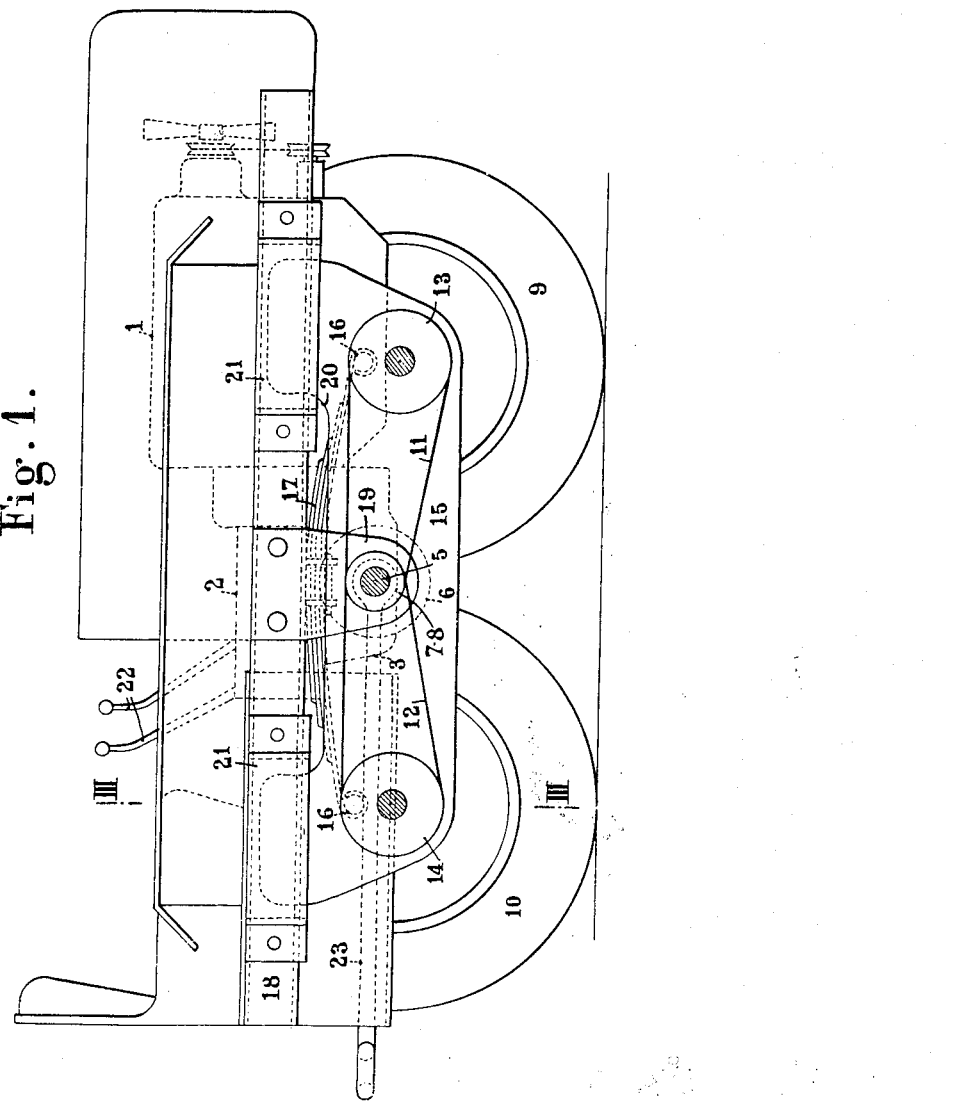
Figure 1 is a diagrammatic elevational view of a first embodiment of the tractor according to the present invention.
Figure 2:
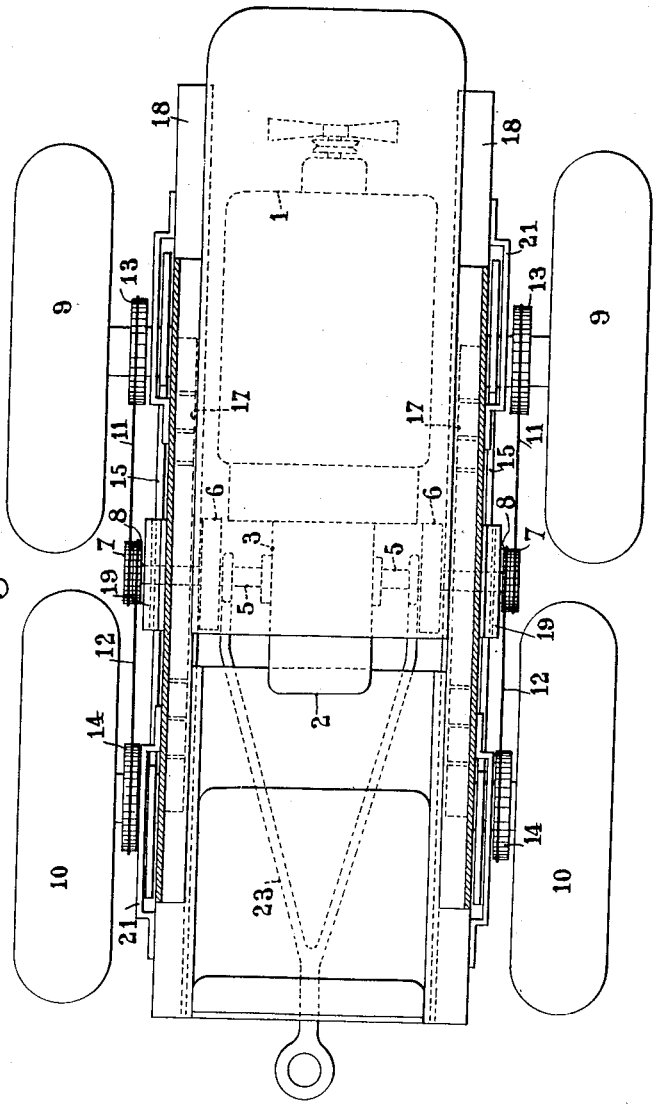
Figure 2 is a diagrammatic plan view of the same.
Figure 3:
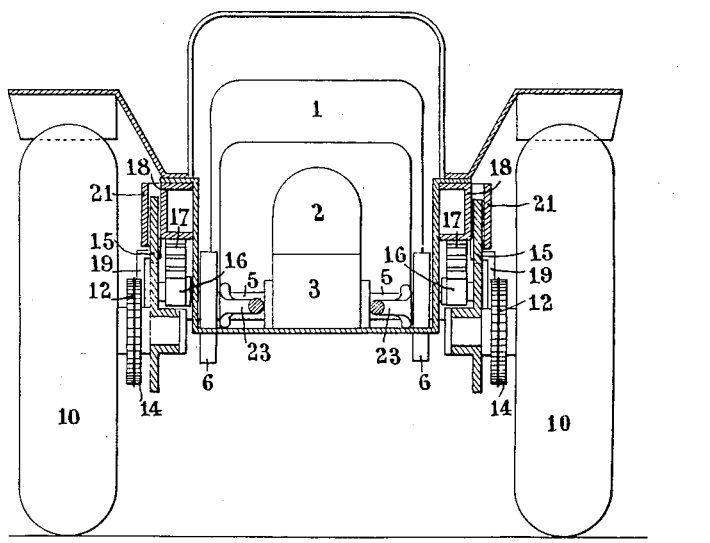
Figure 3 is a sectional view taken on line III—III of Fig. 1.

In the first embodiment, the tractor is equipped with a gasoline or a gas oil engine 1 of rather low total piston displacement, a gear box 2 including several forward drive gears and one single reverse drive gear, one single supporting members 3 which carries a differential gear box, a pair of half shafts 5 on either of which a brake drum 6 and a wheel-driving pinion 7 or 8 is secured. The wheels 9, 10 are driven through chains 11, 12 and sprocket wheels 13, 14 respectively. They are rotatably mounted on the two-armed side-walking beam 15 which in turn is mounted midway of its length for swinging motion about the related half shaft 5. Either arm of said walking-beam 15 is mounted in the one end 16 of the related side spring 17 which is secured midway of its lengh to the bottom of the side sill 18 of the chassis. Each half shaft 5 is rotatably mounted at its outer end in a plate 19 rigid with said side sill 18. The walking-beam 15 is formed in the middle of its top side with a recess 20 adapted to give it the possibility of oscillating about its pivot 5. In the course of the oscillatory movement the top portion of the walking-beam 15 is held in engagement with the side sill 18 by a pair of guides 21. With this end in view, the side sill 18 and the guide 21 firm therewith (see Fig. 2) are provided with flat vertical side faces fronting each other at a short distance from each other, and the flat vertical upper end-part of each arm of the walking-beam 15 is slidably engaged between such a pair of vertical sidefaces provided on the chassis. The sprocket wheels 13 and 14 remain a constant distance from the related driving pinions 7, 8 so that the tension of the chains 11, 12 remains constant.

The tractor is steered by means of levers 22 adapted through the medium of hydraulic or cable transmission means to progressively apply or release the brake drums 6 at either side of the machine as desired.

The trailer coupling gear 23 (or the hoisting tackle) is likewise swingably mounted on the half shafts 5 so that no tilting action shall be exerted upon the chassis.

It has been observed that when a tractor of the kind just described is used in ploughing work the wheels on one side of the machine may rest on firm ground while those at the opposite side will rest on loose soil on which traction is much better, consequently the former show a tendency to skid evidencing the same limitations inherent in every known tractor equipped with a differential gear, although to a lesser degree.

In order to meet this difficulty, in a further embodiment of the invention, the differential is done away with and a twin clutch is used instead by means of which the driver is enabled at will to throw the wheels at either or both sides of the machine into or out of gear. The clutch-actuating mechanism at either side is combined with the corresponding brake-actuating mechanism in such a manner that it becomes possible not only to throw any desired set of wheels out of gear but also to apply the brakes thereon. In the former case the machine will be caused to take a large-radius turn towards that side where the wheels are idle while in the latter the turn will be accomplished in the same direction yet on zero radius.

Figure 4:
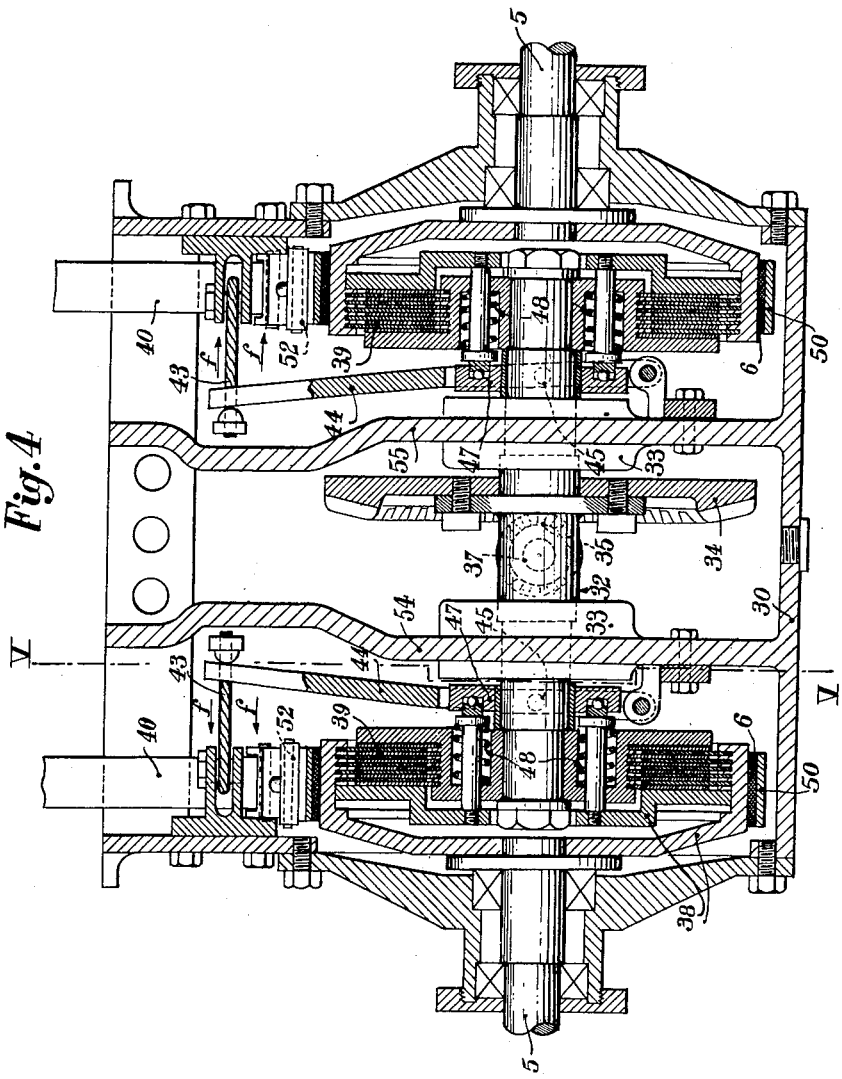
Figure 4 is a vertical sectional view of the driving gear for the half shafts of a tractor according to the second embodiment.

In this embodiment the driving mechanism for the half shafts comprises a casing 30 in which a main shaft 32 is mounted coaxial with the half shafts 5 in bearings 33. Keyed on said main shaft 32 is a bevel gear wheel 34 which meshes with a bevel pinion 35 keyed on the motor shaft 37. Arranged at either end of main shaft 32 are disc clutches 38—39 adapted to couple either half shaft 5 with the said main shaft. Each of said clutches is actuated as desired by means of a lever 40 pivoted at 42 and adapted through a cable 43 to pull a fork 44 pivoted at 45. Said fork 44 is adapted to shift a ring 47 mounted on shaft 32 to disengage the clutch against the action of compression springs 48. Arrows f (see Fig. 4) indicate the direction of displacement of the various movable parts in the disengagement of the clutches. Pivoted to the said lever 40 is the one end of the brake-actuating rigging which as shown in Fig. 5 comprising a cable 49 and a strap 50 hinged at 52 and 53 and which encompasses the brake drum 6 on the related half shaft 5.

The clutch-releasing and brake-applying mechanisms are so adjusted relative to each other that upon the actuation of the control lever in the clutch-disengaging direction the clutch is released first; in this manner, a range of positions is provided over which the half shaft concerned is out of gear yet not retarded and a further range of positions over which the brake is applied to the already disengaged half shaft.

The driver is thus enabled, by actuating one single lever 40 of the pair, to let the related wheels run idle. Only the wheels on the opposite side remain in gear, whereby the tractor is caused to turn towards that side where the wheels are idle. By moving the same control lever further on, he is able to progressively exert a braking action upon the pair of wheels now cut off from power and even to lock them altogether; with the wheel pair thus locked the ones on the opposite side will go on advancing the machine, as a consequence of which it will turn on zero radius. In order to stop the tractor it is only necessary to actuate both levers at one time, which results in the four wheels being at first set out of gear and eventually locked all together.

For ploughing the four wheels are driven without being interconnected by a differential gear, as a result the tractor will move along irrespective of differences in the traction of the wheels on either side.

Preferably, the discs 38 in the clutches 39 are designed to work in a dry state in order that power may be better transmitted. The bevel gear wheel 34 works in an oil bath contained by a pair of partitions 54, 55.

The provision of separate side walking-beams is particularly useful in running on uneven ground since traction of the wheels is ensured at all times, in addition to which such a mechanism is extremely sturdy. As a result, the tractor need not be overweighted nor consequently overpowered, so that it can be manufactured at a considerably lower cost although is performances are equal to those of heavier and higher-priced machines on the market. This involves appreciable fuel savings and use of all the horsepower delivered by the engine.

It remains within the scope of the invention to modify certain details which are not essential to its performance.

What I claim is:

1. In a tractor having a chassis and a prime mover on said chassis, a pair of shafts extending transversely to opposite sides of said chassis at its central portion and disposed in axial alignment with one another, driving connections between each of said shafts and the prime mover, a pair of walking beams extending longitudinally of the chassis and disposed at opposite sides of the chassis, means pivotally supporting each of said walking beams at its mid point on the chassis coaxially with said shafts for oscillation in a vertical plane relative to the chassis and relative to each other, said walking beams being free of interconnection with one another so that the oscillation of one walking beam is independent of the other, spring members for each of said walking beams fixedly mounted on fixed parts of the chassis and having portions bearing on the opposite end portions of the corresponding walking beam, said spring means acting resiliently between said walking beams and chassis to maintain said chassis approximately level, the spring members acting on one walking beam being independent of the spring members acting on the other walking beam, means rotatably mounting a driving wheel on each of the opposite end portions of each of said walking beams, the axis of each wheel being parallel to the axis of said shafts, and additional driving connections between each of said shafts and the driving wheels on the corresponding walking beam, said driving wheels being the sole load-carrying wheels of the vehicle and taking the entire load of the vehicle.

2. A tractor according to claim 1, in which each of said walking beams has upwardly extending portions at its opposite ends and further comprising guide means on said chassis slidably receiving said upwardly extending portions of said walking beams to thereby maintain the plane of oscillation of said walking beams parallel to the longitudinal axis of the chassis, said walking beams and said guide means cooperating with said spring means to assist in keeping said wheels operating in a vertical plane with positive traction and with front and rear wheels in proper axial spacing.

3. A tractor according to claim 1, in which said spring members comprise a leaf spring at each of the opposite sides of the chassis, each of said leaf springs being fixedly mounted at its middle portion on a fixed part of the chassis and having its opposite end portions bearing on opposite end portions of the corresponding walking beam.

References Cited in the file of this patent

UNITED STATES PATENTS

| | | |
|---|---|---|
| 1,272,287 | Martell et al. | July 9, 1918 |
| 1,318,557 | Heinze | Oct. 14, 1919 |
| 1,741,425 | Masury | Dec. 31, 1929 |
| 1,842,074 | Davis | Jan. 19, 1932 |
| 1,887,042 | Rogers | Nov. 8, 1932 |
| 1,921,660 | Church | Aug. 8, 1933 |
| 1,992,365 | Fageol | Feb. 26, 1935 |
| 2,018,862 | Meyer | Oct. 29, 1935 |
| 2,124,047 | Allin et al. | July 19, 1938 |
| 2,172,173 | Peterman | Sept. 5, 1939 |
| 2,288,246 | Kuester | June 30, 1942 |
| 2,416,478 | Harbers | Feb. 25, 1947 |
| 2,434,693 | Graham | Jan. 20, 1948 |
| 2,589,948 | Marshall | Mar. 18, 1952 |
| 2,595,474 | Marvin | May 6, 1952 |